(12) United States Patent
Kim (10) Patent No.: US 11,526,432 B2
(45) Date of Patent: Dec. 13, 2022

(54) PARALLEL PROCESSING DEVICE

(71) Applicant: MORUMI CO., LTD., Seongnam-si (KR)

(72) Inventor: Tae Hyoung Kim, Seongnam-si (KR)

(73) Assignee: MORUMI Co., Ltd., Seongnam-si (KR)

( * ) Notice: Subject to any disclaimer, the term of this patent is extended or adjusted under 35 U.S.C. 154(b) by 7 days.

(21) Appl. No.: 17/052,936

(22) PCT Filed: May 20, 2019

(86) PCT No.: PCT/KR2019/005980
§ 371 (c)(1),
(2) Date: Nov. 4, 2020

(87) PCT Pub. No.: WO2019/221569
PCT Pub. Date: Nov. 21, 2019

(65) Prior Publication Data
US 2021/0191847 A1  Jun. 24, 2021

(30) Foreign Application Priority Data

May 18, 2018 (KR) .................. 10-2018-0057380
May 20, 2019 (KR) .................. 10-2019-0058629

(51) Int. Cl.
*G06F 12/02* (2006.01)
*G06F 1/14* (2006.01)

(52) U.S. Cl.
CPC .............. *G06F 12/023* (2013.01); *G06F 1/14* (2013.01); *G06F 2212/254* (2013.01)

(58) Field of Classification Search
None
See application file for complete search history.

(56) References Cited

U.S. PATENT DOCUMENTS 5,524,264 A * 6/1996 Shirota ............... G06F 15/8015
712/30
5,586,289 A * 12/1996 Chin ................. G06F 15/17368
711/111

(Continued)

FOREIGN PATENT DOCUMENTS

JP  2011-028343 A  2/2011
KR  10-0835173 B1  6/2008

OTHER PUBLICATIONS

International Search Report for PCT/KR2019/005980 dated Sep. 5, 2019 from Korean Intellectual Property Office.

*Primary Examiner* — Charles Rones
*Assistant Examiner* — Ryan Dare
(74) *Attorney, Agent, or Firm* — Paratus Law Group, PLLC (57) ABSTRACT

There is provided a parallel processing device which allows consecutive parallel data processing to be performed. The parallel processing device includes: a plurality of addition units configured to selectively receive input data among output data from the plurality of input units according to configuration values for each addition unit of the plurality of addition units, and perform addition operation for the input data in parallel; and the plurality of delay units configured to delay input data for one cycle. Each delay unit of the plurality of the delay units delays output data from each addition unit of the plurality of addition units and outputs the delayed output data to each input unit of the plurality of input units.

5 Claims, 4 Drawing Sheets

(56) References Cited

U.S. PATENT DOCUMENTS

| | | | |
|---|---|---|---|
| 2007/0182746 A1* | 8/2007 | Jiao | G06F 9/30014 345/502 |
| 2012/0278373 A1* | 11/2012 | Kobayashi | G06F 7/762 708/404 |
| 2015/0033001 A1* | 1/2015 | Ivanov | G06F 13/4068 712/225 |
| 2019/0361673 A1* | 11/2019 | Kim | G06F 15/80 |

* cited by examiner

PARALLEL PROCESSING DEVICE

CROSS-REFERENCE TO PRIOR APPLICATIONS

This application is a National Stage Patent Application of PCT International Patent Application No. PCT/KR2019/005980 (filed on May 20, 2019) under 35 U.S.C. § 371, which claims priority to Korean Patent Application Nos. 10-2018-0057380 (filed on May 18, 2018) and 10-2019-0058629 (filed on May 20, 2019), which are all hereby incorporated by reference in their entirety.

BACKGROUND

The following description relates to a parallel processing device.

Most parallel processing devices according to conventional arts operate in a way in which a plurality of processors process a plurality of threads. Such parallel processing devices are not appropriate for performing a very long sequential calculation in parallel.

As the conventional art for a parallel processing device which performs a sequential calculation in parallel, there is a technology disclosed in Korean Patent No. 10-0835173 (title: Apparatus and Method for Multiply-and-Accumulate Operations in Digital Signal Processing). The disclosed conventional art is appropriate for filtering and performing a fast Fourier transform (FFT) and the like but has aspects inappropriate for consecutively performing various calculations which may be performed by a central processing unit (CPU).

SUMMARY

The following description is directed to providing a parallel processing device capable of performing various sequential calculations, which are performed by a central processing unit (CPU), in parallel and consecutively.

In one general aspect, there is provided a parallel processing device capable of consecutive parallel data processing, the parallel processing device including a calculation path network configured to receive a plurality of pieces of delay data output from a delay processing unit, a plurality of pieces of memory output data output from a memory, and a plurality of calculation path network control signals and configured to output a plurality of pieces of calculation path network output data, and the delay processing unit configured to output the plurality of pieces of delay data obtained by delaying the plurality of pieces of calculation path network output data. Each of the plurality of pieces of calculation path network output data is a value obtained by performing a calculation, which corresponds to one of the plurality of calculation path network control signals corresponding to the piece of calculation path network output data, on the plurality of pieces of delay data and the plurality of pieces of memory output data.

A parallel processing device described below can perform various sequential calculations, which may be performed by a central processing unit (CPU), in parallel and consecutively. Accordingly, it is possible to increase a calculation processing rate and calculation processing efficiency.

DETAILED DESCRIPTION

Since the present invention can be modified to various forms and include various embodiments, specific embodiments will be illustrated in the accompanying drawings and described in detail. However, the description is not intended to limit the present invention to the specific embodiments, and it is to be understood that all the changes, equivalents, and substitutions belonging to the technical spirit and technical scope of the present invention are included in the present invention.

The terms such as "first," "second," "A," "B," etc. may be used to describe various elements, but the elements are not limited by the terms. These terms are used only to distinguish one element from another element. For example, a first element may be named a second element, and similarly, the second element may also be named the first element without departing from the scope of the present invention. The term "and/or" includes combinations of a plurality of associated listed items or any one of the associated listed items.

A singular expression used herein includes a plural expression unless it has a clearly opposite meaning in the context. It will be appreciated that terms such as "including," "having," etc. are intended to designate the presence of characteristics, numbers, steps, operations, elements, parts, or combinations thereof, and do not exclude presence or addition of one or more other characteristics, numbers, steps, operations, elements, parts, or combinations thereof.

Prior to describing the drawings in detail, the division of configuration units in the present specification is only a division by the main function of each configuration unit. In other words, two or more of the configuration units to be described below may be combined into a single configuration unit, or one configuration unit may be divided into two or more units according to subdivided functions. Each of the configuration units to be described below may additionally perform a part or all of the functions among functions set for other configuration units other than being responsible for the main function, and some main functions taken by each of the configuration units may be exclusively taken and performed by other configuration units.

When a method or an operating method is performed, steps of the method may be performed in a different order from a described order unless a specific order is clearly mentioned in the context. In other words, steps may be performed in the same order as described, performed substantially simultaneously, or performed in reverse order.

Figure 1:
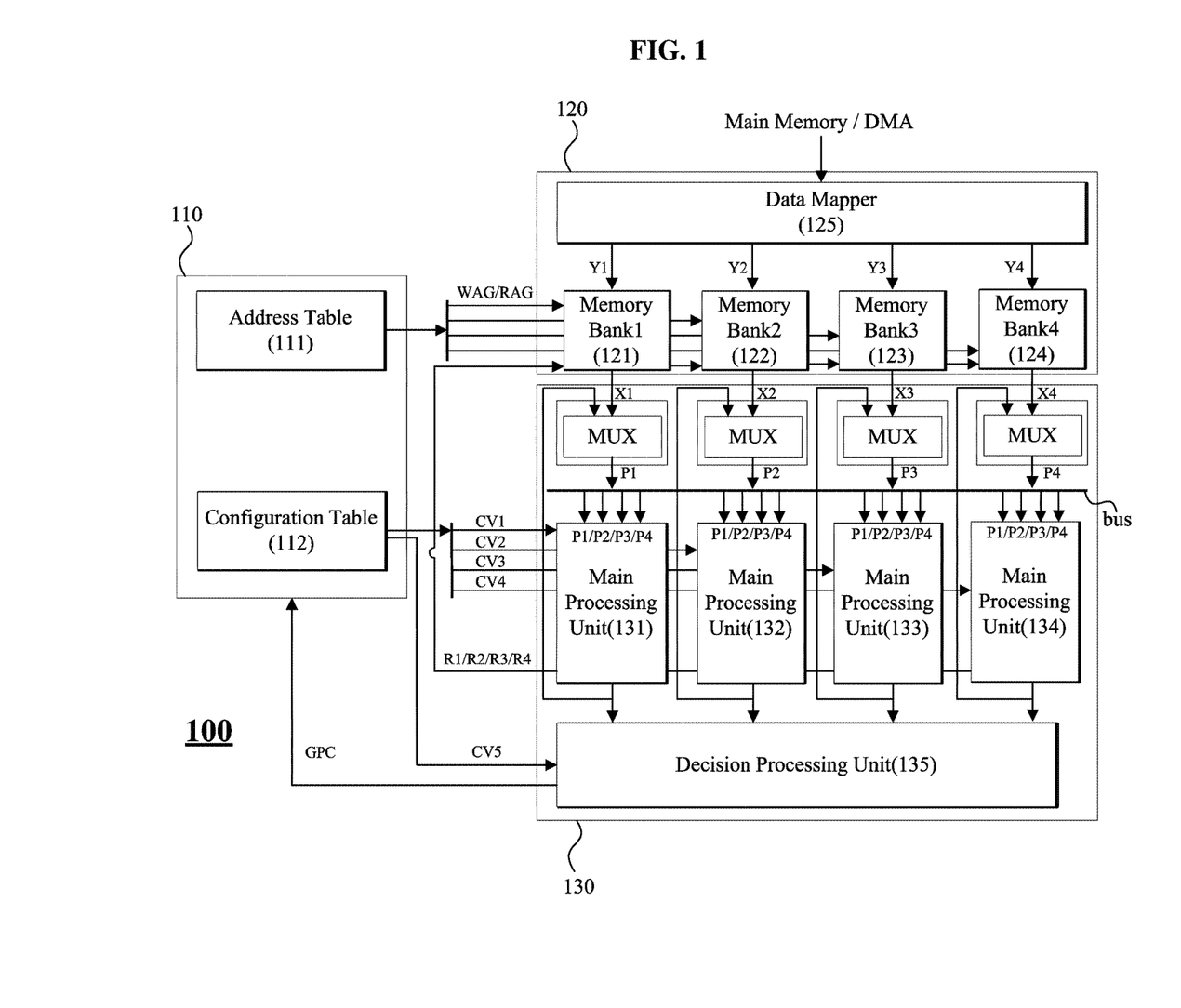
FIG. 1 illustrates an example of a parallel processing device.

FIG. 1 illustrates an example of a parallel processing device 100.

The parallel processing device 100 includes an address and configuration value generation unit 110, a memory 120, and a parallel processing unit 130. Although not shown in FIG. 1, the parallel processing device may further include a direct memory access (DMA), a main memory, and an input and output device.

The address and configuration value generation unit 110 may transfer a read address group RAG and a write address group WAG to the memory 120. The read address group RAG includes a plurality of read addresses, and the write address group WAG includes a plurality of write addresses. The address and configuration value generation unit 110 may include an address table 111 for storing a plurality of read address groups RAG and/or a plurality of write address groups WAG.

The address and configuration value generation unit 110 transfers a configuration value group CVG to the parallel processing unit 130. The configuration value group CVG includes a plurality of main processing configuration values CV1, CV2, CV3, and CV4 and a decision processing configuration value CV5. The address and configuration value generation unit 110 may include a configuration value table 112 for storing a plurality of configuration value groups CVG.

The address and configuration value generation unit 110 may output a read address group RAG, a write address group WAG, and a configuration value group CVG which are stored in a location corresponding to information transferred from a decision processing unit 135. Alternatively, the address and configuration value generation unit 110 may output a read address group RAG, a write address group WAG, and a configuration value group CVG according to information transferred from a separate control unit.

The address and configuration value generation unit 110 outputs a read address group RAG, a write address group WAG, and a configuration value group CVG which are stored in a location corresponding to a program counter GPC transferred from a decision processing unit 135.

The memory 120 includes, for example, four memory banks 121, 122, 123, and 124. Each of the first to fourth memory banks 121 to 124 may be, for example, dual port random access memory (RAM). The memory 120 outputs read data groups X1 to X4 corresponding to read address groups RAG. Also, the memory 120 stores write data groups Y1 to Y4 according to write address groups WAG.

The memory 120 may further include a data mapper 125. The data mapper 125 may receive data transferred from the DMA and pieces of data R1, R2, R3, and R4 transferred from the parallel processing unit 130 and obtain the write data groups Y1 to Y4 by arranging the received data with locations of the memory banks 121 to 124 in which the received data will be stored. The data mapper 125 may output the write data groups Y1 to Y4 to the memory banks 121 to 124, respectively. Also, the data mapper 125 may transfer data to be stored in the main memory from the memory 120 to the DMA.

The parallel processing unit 130 includes, for example, four main processing units 131, 132, 133, and 134 and the decision processing unit 135. The main processing units 131 to 134 may perform a specific calculation on the read data groups X1 to X4. The main processing units 131 to 134 perform operations corresponding to the input main processing configuration values CV1 to CV4. The decision processing unit 135 receives outputs of the main processing units 131 to 134 and makes a decision for a next operation. The decision processing unit 135 performs an operation corresponding to the decision processing configuration value CV5. The parallel processing unit 130 outputs the plurality of pieces of data R1, R2, R3, R4, and GPC which are finally calculated.

Figure 2:
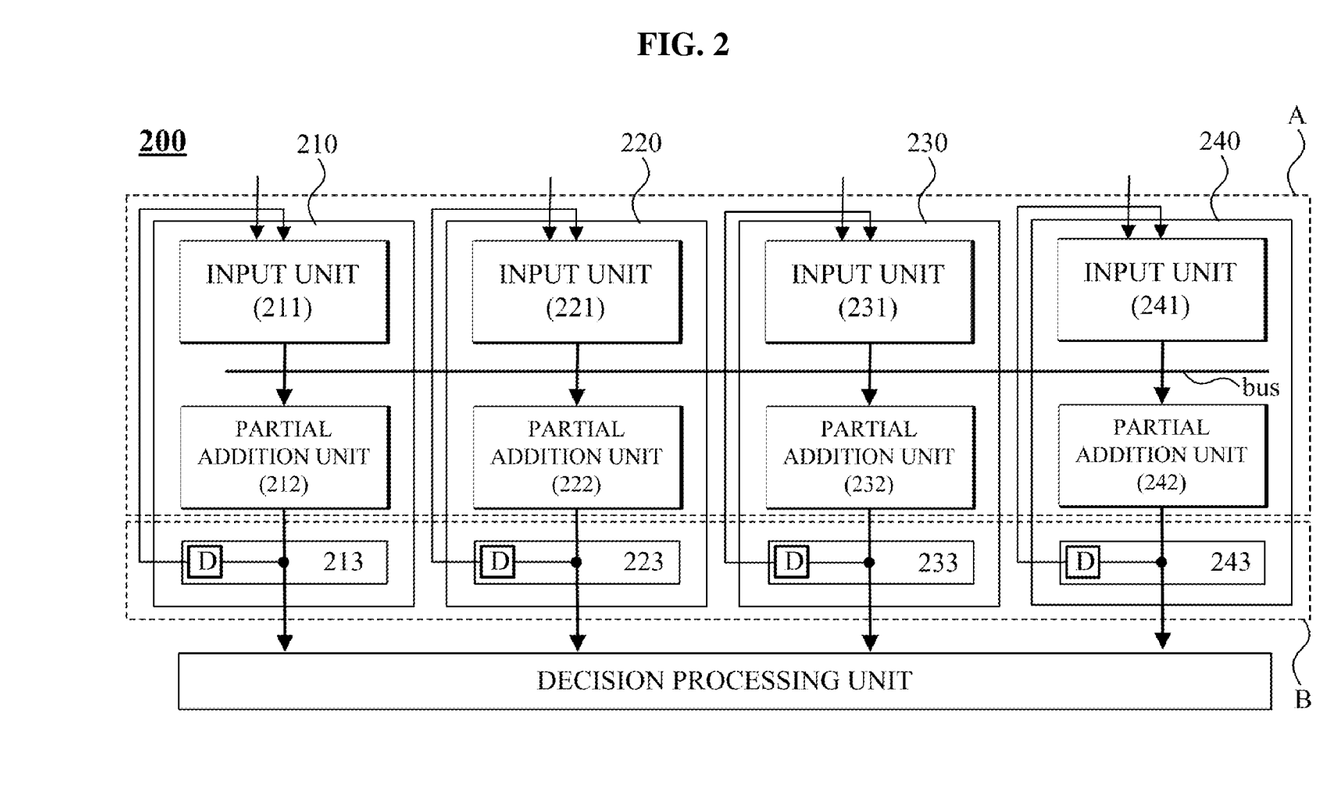
FIG. 2 illustrates an example of a parallel processing unit.

FIG. 2 illustrates an example of a parallel processing unit 200. The parallel processing unit 200 is an element corresponding to the parallel processing unit 130 of FIG. 1. The parallel processing unit 200 is an example of an element including four main processing units 210, 220, 230, and 240.

Each of the plurality of main processing units may include an input unit, a partial addition unit, and a delay unit. The main processing unit 210 includes an input unit 211, a partial addition unit 212, and a delay unit 213. The main processing unit 220 includes an input unit 221, a partial addition unit 222, and a delay unit 223. The main processing unit 230 includes an input unit 231, a partial addition unit 232, and a delay unit 233. The main processing unit 240 includes an input unit 241, a partial addition unit 242, and a delay unit 243.

The input units 211, 221, 231, and 241 may separately receive data from the memory banks. Also, outputs of the partial addition units 212, 222, 232, and 242 may be fed back to the input units 211, 221, 231, and 241. Accordingly, the input units 211, 221, 231, and 241 may include multiplexers MUX for selecting any one of a plurality of pieces of input data.

The partial addition units 212, 222, 232, and 242 may perform an addition operation on a plurality of pieces of input data. Each of the partial addition units 212, 222, 232, and 242 may receive all pieces of data output from the input units 211, 221, 231, and 241. For example, outputs of the input units 211, 221, 231, and 241 may be connected to a collective bus in which no collision occurs between signals as shown in FIG. 2, and thus the outputs of the input units may be selectively transferred to the partial addition units 212, 222, 232, and 242 according to configuration values. The address and configuration value generation unit 110 transfers a configuration value group CVG to the parallel processing unit 130. The configuration values indicate a plurality of main processing configuration values CV1, CV2, CV3, and CV4 in the configuration value group CVG.

The input units 211, 221, 231, and 241 and the partial addition units 212, 222, 232, and 242 function to transfer input data or calculation results to a set path. The partial addition units 212, 222, 232, and 242 are elements which perform specific calculations and also transfer data. Such a structure may be referred to as a calculation path network. In FIG. 2, a structure indicated by A is a calculation path network.

The delay units 213, 223, 233, and 243 delay output data of the partial addition units 212, 222, 232, and 242 for one cycle and input the delayed output data to the input units 211, 221, 231, and 241 in the next cycle. The delay units 213, 223, 233, and 243 delay data corresponding to a current time point using a signal delayer D and transfer the delayed data to the input units 211, 221, 231, and 241 in the next cycle. In other words, the delay units 213, 223, 233, and 243 delay and transfer data according to a clock.

The delay units 213, 223, 233, and 243 may include memories (registers) for storing information corresponding to a current cycle. The delay units 213, 223, 233, and 243 may store output values of the partial addition units 212, 222, 232, and 242 in the registers and transfer the output values stored in the registers to the input units 211, 221, 231, and 241 in the next cycle.

In addition, a plurality of required pieces of data are supplied to the input units 211, 221, 231, and 241 using the delay units 213, 223, 233, and 243 so that a calculation process indicated in a programming code (of a software designer) may be performed in parallel using as many calculation resources of the main processing units 210, 220, 230, and 240 as possible. This process requires a consecutive parallel data processing function in every cycle to increase efficiency in parallel data processing calculation. The partial addition function and the data path configuration function (a data rearrangement function for a next-cycle calculation) of the partial addition units are used together so that consecutive parallel data processing is made possible. In other words, with the partial addition units which provide a structure for performing the data rearrangement function and the data calculation function together, it is possible to configure a parallel processing device capable of consecutive parallel data processing for increasing efficiency in parallel data processing calculation.

In FIG. 2, all of the delay units 213, 223, 233, and 243 are indicated by B. In the parallel processing unit 200, a structure corresponding to all of the delay units 213, 223, 233, and 243 is referred to as a delay processing unit.

The decision processing unit receives outputs of the main processing units 210 to 240 and makes a decision. On the basis of information or flags generated in a current cycle by the main processing units 210 to 240, the decision processing unit may make a decision on or take control of information generated in the next cycle. Assuming that a current cycle is T1 and the next cycle is T2, the decision processing unit performs a specific calculation or makes a decision on the basis of information generated in T1 by the main processing units 210 to 240. The decision processing unit may determine whether data processing has been finished on the basis of output results of the main processing units 210 to 240. When data processing has not been finished, the decision processing unit may transfer information to the address and configuration value generation unit 110 so that the main processing units 210 to 240 may perform an ongoing calculation or a calculation process which has been prepared for execution in T2. Processing results of the delay units 213, 223, 233, and 243 may be stored in the memory banks as necessary.

Figure 3:
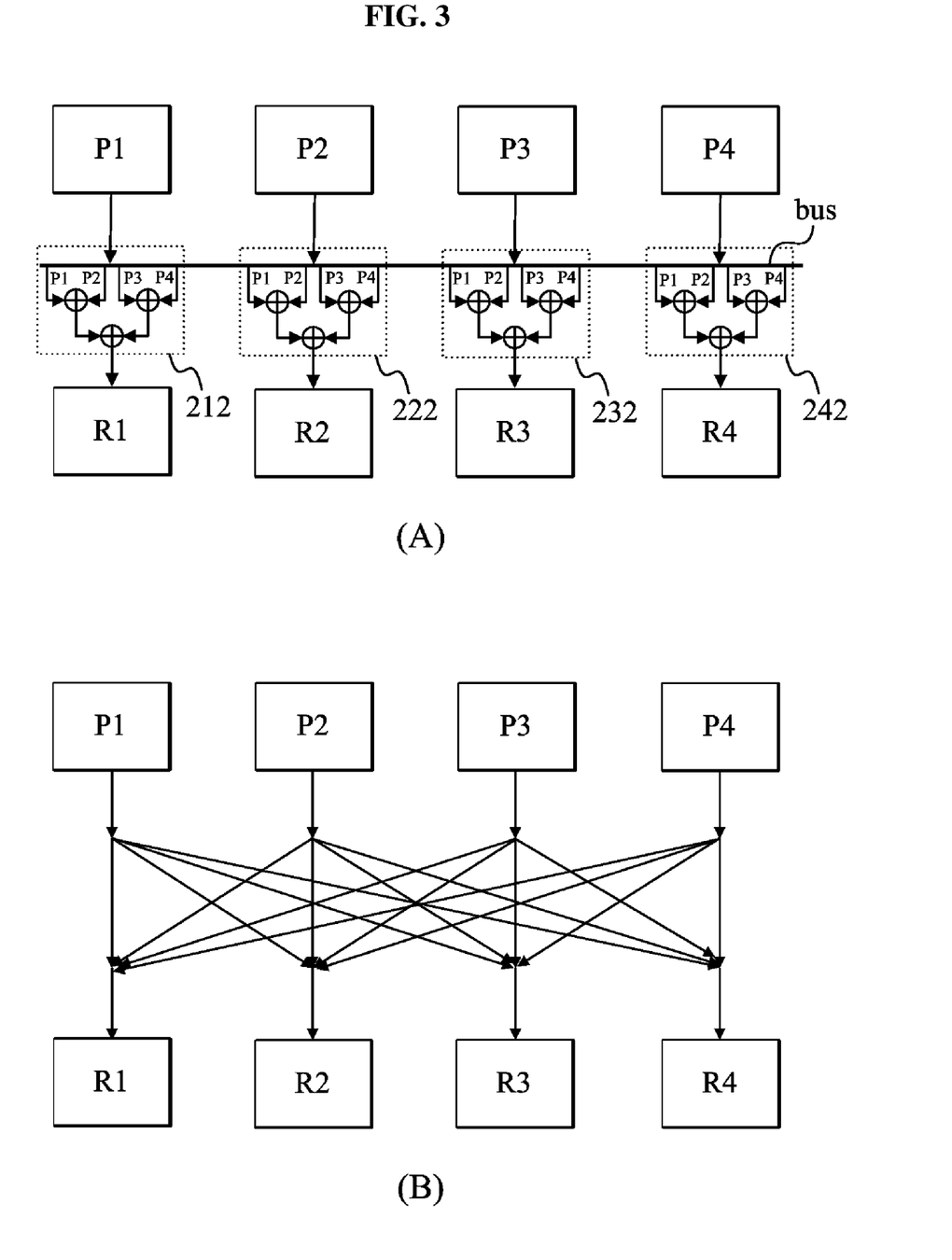
FIG. 3 illustrates an example of an operation of partial addition units.

FIG. 3 illustrates an example of an operation of partial addition units. FIG. 3 shows an example of a case in which there are four main processing units. All the main processing units of FIG. 3 may be considered as having a 4-port path. In FIG. 3, points indicated by P1 to P4 correspond to outputs of an input unit. Also, the plurality of calculation units or partial addition units 212, 222, 232, and 242 output calculation results, and each of the results is transferred to points R1, R2, R3, and R4.

FIG. 3A shows an example of performing the partial addition function in a 4-port path. The partial addition units 212, 222, 232, and 242 selectively add results output by the input units according to configuration values of the main processing CV1, CV2, CV3, and CV4. As an example, the partial addition unit 212 is described. The partial addition unit 212 may receive P1, P2, P3, and P4. The partial addition unit 212 includes three adders in total. Unlike FIG. 3, a partial addition unit may have another calculation structure. The partial addition unit 212 may add P1, P2, P3, and P4 in various combinations.

For consecutive parallel processing, the partial addition units 212, 222, 232, and 242 input outputs, which are selective partial addition values of input data, to designated input units, which are derived in a compile process for parallel processing of a programming code, through the delay units in the next cycle according to configuration values. This process may be considered a process in which the partial addition units 212, 222, 232, and 242 rearrange input data in a specific order.

The partial addition units 212, 222, 232, and 242 perform a function of selecting one or more of outputs of the input units 211, 221, 231, and 241 according to a partial addition configuration value and adding the selected one or more outputs. As described above, the partial addition configuration value is received from the address and configuration value generation unit 110. As an example, according to the partial addition configuration value, the first, second, third, and fourth partial addition units 212, 222, 232, and 242 may output an output of P1 (the first input unit 211), an output of P2 (the second input unit 221), an output of P3 (the third input unit 231), and an output of P4 (the fourth input unit 241), respectively. As an example, according to the partial addition configuration value, the first, second, third, and fourth partial addition units 212, 222, 232, and 242 may output an output of P4 (the fourth input unit 241), an output of P1 (the first input unit 211), an output of P2 (the second input unit 221), and an output of P3 (the third input unit 231), respectively. As another example, according to the partial addition configuration value, the first, second, third, and fourth partial addition units 212, 222, 232, and 242 may output the sum of outputs of the second to fourth input units 221, 231, and 241, the sum of outputs of the first, third, and fourth input units 211, 231, and 241, the sum of outputs of the first, second, and fourth input units 211, 221, and 241, and the sum of outputs of the first to third input units 211, 221, and 231, respectively. As another example, according to the partial addition configuration value, the first, second, third, and fourth partial addition units 212, 222, 232, and 242 may output a value obtained by subtracting an output of the second input unit 221 from an output of the first input unit 211, a value obtained by subtracting an output of the third input unit 231 from an output of the second input unit 221, a value obtained by subtracting an output of the fourth input unit 241 from an output of the third input unit 231, and a value obtained by subtracting an output of the first input unit 211 from an output of the fourth input unit 241, respectively.

To this end, the partial addition units 212, 222, 232, and 242 may receive outputs of input units through the bus connected to the outputs of the input units 211, 221, 231, and 241.

FIG. 3B shows a possible example of a data transmission path in a 4-port path. The partial addition units 212, 222, 232, and 242 may store selective addition results of output values of the input units P1 to P4 in the registers. The partial addition units 212, 222, 232, and 242 can perform a calculation on various combinations of input data. Consequently, results output by the partial addition units 212, 222, 232, and 242 may bring about effects like transferring the input data P1, P2, P3, and P4 to registers of the partial addition units 212, 222, 232, and 242 or other registers through designated calculation or processing. As shown in FIG. 3B, this produces effects as if the partial addition units 212, 222, 232, and 242 transfer calculation results to various paths.

As an example of parallel processing, Example 1 is described in detail below on the basis of the structure illustrated in FIG. 3. Example 1 is expressed in C language.

Example 1

```
P1 = 0;
P2 = 0;
P3 = 0;
P4 = 1;
do {
  CUR = P1 + P2 + P3 + P4;
  P4 = P4;
  P3 = P2;
  P2 = P1;
  P1 = CUR;
} while (CUR < 10)
```

Assuming that Example 1 is sequentially executed, it may take 10 cycles to execute "do { . . . } while (CUR<10)" once.

A do-while loop in a sequential processing code having attributes like Example 1 may be consecutively executed in every cycle using a single-cycle parallel processing calculation function of FIG. 3. Calculation result values of R1, R2, R3, and R4 are respectively input to P1, P2, P3, and P4 in the next cycle according to a value in a table (item) of the address and configuration value generation unit of FIG. 1.

Modern processors have multistage instruction pipelines. Each stage in the pipeline corresponds to a processor which executes instructions for performing different actions in the same stage. An N-stage pipeline can have up to N different instructions at different stages of completion. A canonical pipelined processor has five stages (instruction fetch, decoding, execution, memory access, and write back). The Pentium 4 processor has a 31-stage pipeline. In pipelining, some processors can issue one or more instructions with instruction-level parallelism. These processors are known as superscalar processors. Instructions can be grouped together as long as there is no data dependency therebetween.

In general, a case in which all instructions can be parallelly executed in unit of groups without re-ordering and a change in the results is referred to as instruction-level parallelism. Instruction-level parallelism dominated computer architecture from the mid-1980s until the mid-1990s. However, instruction-level parallelism cannot remarkably overcome problems of consecutive parallel data processing, and thus its use is limited now.

A dependency of a loop is dependent on one or more results of a previous cycle. A data dependency of the following loop obstructs the progress of parallelism. For example, in <Example 1>

Example 1

```
P1 = 0;
P2 = 0;
P3 = 0;
P4 = 1;
do {
   CUR = P1 + P2 + P3 + P4;
   P4 = P4;
   P3 = P2;
   P2 = P1;
   P1 = CUR;
} while (CUR < 10)
```

It is generally believed that this loop cannot be parallelized. This is because CUR becomes dependent on P1, P2, P3, and P4 while circulating through each loop. Since each cycle depends on previous results, the loop cannot be parallelized.

However, when Example 1 is executed with a single-cycle parallel processing device employing the path network of FIG. 3, it is possible to avoid data dependencies arising upon parallel processing and consecutively execute the do-while loop in every cycle. A single-cycle parallel processing procedure for Example 1 may be expressed as follows.

<Single-Cycle Parallel Processing Procedure for Example 1>

```
1. The mark // denotes an annotation.
2. The mark [. . .] denotes a calculation performed during one cycle or an initial
configuration value.
3. The mark => denotes a physical signal connection.
4. All code lines are simultaneously executed.
The corresponding parallel processing procedure is as follows.
// parallel processing initialization start
[P1 = 0; P2 = 0; P3 = 0; P4 = 1]     // initial data values
DoLoop:
[
P1 => R2;                            // R2 is input to P2 in the next cycle
P2 => R3;                            // R3 is input to P3 in the next cycle
P3 => R4;                            // R4 is input to P4 in the next cycle
P1 + P2 + P3 + P4 => CUR => R1;// R1 is input to P1 in the next cycle
                                     // R1, R2, R3 and R4 are output of the partial addition
units respectively
(R1 < 10)? Go to DoLoop or OutLoop;
]
OutLoop: // parallel processing end
```

Data dependencies which arise upon executing a program code can be avoided through simultaneous mapping (connection) between a plurality of pieces of calculator (path network) input data and a plurality of pieces of calculator (path network) output data. Avoiding data dependencies makes it possible to maximize a data processing amount that can be processed in parallel at the same time. The plurality of calculators are not limited to a path network. When the following conditions are conceptually satisfied, it is possible to avoid data dependencies arising upon executing a program code through simultaneous mapping (connection) between a plurality of pieces of calculator input data and a plurality of pieces of calculator output data.

First, a parallel processing device designed according to the following consistent parallel data processing rules is referred to as a single-cycle parallel processing device.

The single-cycle parallel processing device is assumed to be a plurality of calculation (and data) processors, each of which receives at least one piece of data.

The single-cycle parallel processing device (i) arranges data to be processed and stores the arranged data before processing.

(ii) calculates the stored data in one cycle and then rearranges the results to use in the next one cycle.

(iii) can perform consecutive parallel data processing when having a structure in which rearranged results of a previous one cycle can be used in a current one cycle.

In this case, the single-cycle parallel processing device can perform consecutive parallel data processing, but it is difficult to increase efficiency in consecutive parallel data processing unless data dependencies arising upon executing a code are avoided.

To increase efficiency in parallel data processing, data dependencies arising upon executing a code can be avoided through simultaneous mapping (connection) between a plurality of pieces of calculator input data and a plurality of pieces of calculator output data. This is because when [input data groups] and [output data groups made up of combinations of the input data groups] are simultaneously connected in available calculation resources of the calculator, an intended program code can be written simply through connection (mapping) between the input data groups and the output data groups regardless of a data processing sequence. For example, C language which is a procedural description language and Verilog which is a hardware description language have different code description methods, but an intended program can be written in both the languages. Consequently, when a parallel processing routine equivalent to a C program code and the corresponding parallel processing compiler are designed in Verilog, it is possible to avoid data dependencies arising upon executing a code through simultaneous mapping (connection) between a plurality of pieces of input data and a plurality of pieces of output data, and an intended program can be written.

Figure 4:
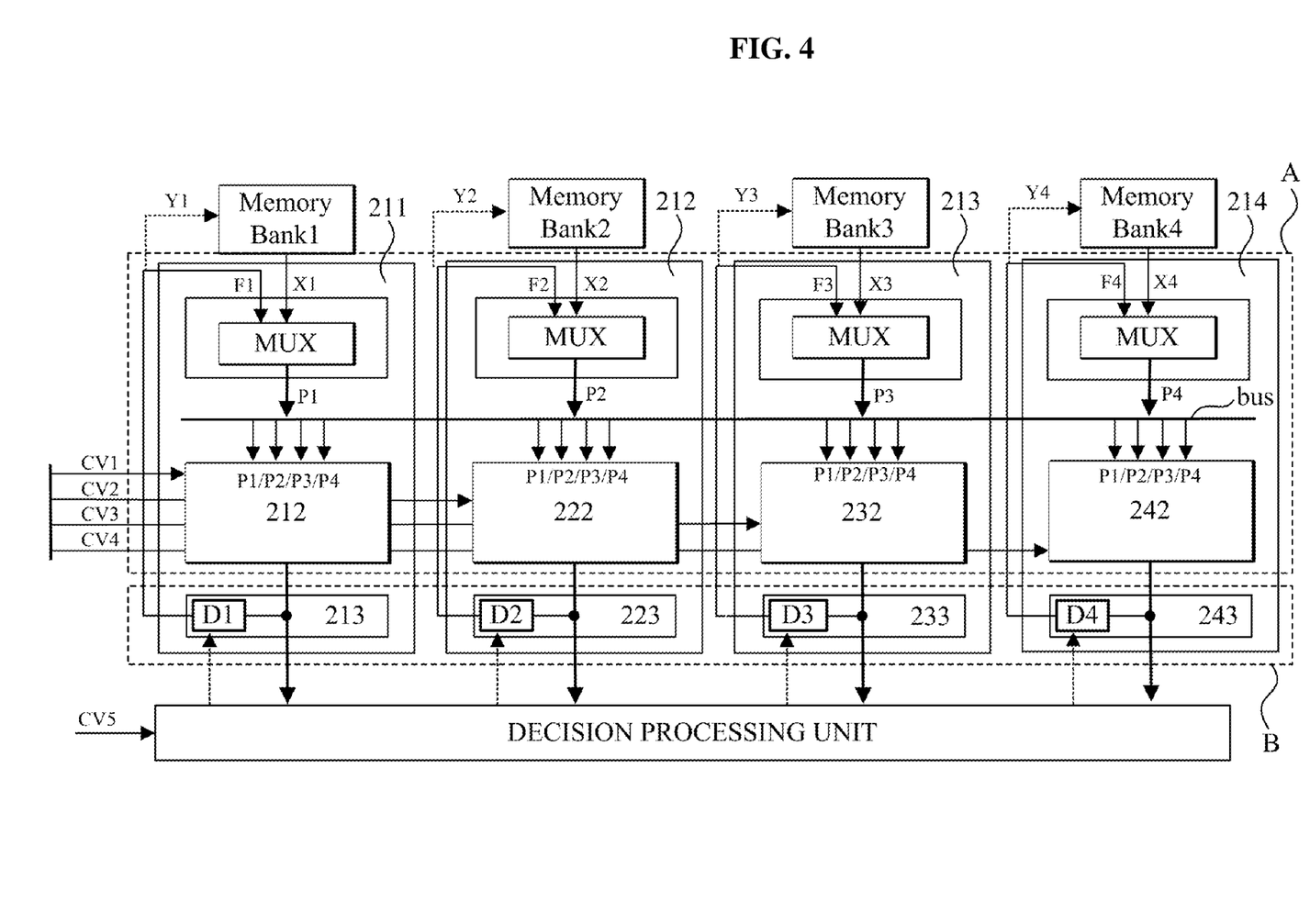
FIG. 4 illustrates an example of an operation of the parallel processing unit.

FIG. 4 illustrates an example of an operation of the parallel processing unit 200.

As described above, the memory banks receive data from the main memory and the like. The plurality of memory banks (memory bank 1, memory bank 2, memory bank 3, and memory bank 4) store arranged data. The memory mapper may arrange and transfer data to be stored in the memory banks.

The input units 211, 212, 213, and 214 include the multiplexers MUX. The input units 211, 212, 213, and 214 select one of data input from the memory banks and data input from the delay units 213, 223, 233, and 243 using the multiplexers MUX.

The partial addition units 212, 222, 232, and 242 may perform an addition operation on data output from the input units 211, 212, 213, and 214. As described above, the partial addition units 212, 222, 232, and 242 may perform various calculations on possible combinations of outputs of the input units 211, 212, 213, and 214. Also, each of the partial addition units 212, 222, 232, and 242 may transfer the calculation result to at least one of the delay units 213, 223, 233, and 243.

Each of the partial addition units 212, 222, 232, and 242 transfers the calculation result to the delay units 213, 223, 233, and 243. In this case, the partial addition units 212, 222, 232, and 242 transfer the calculation results to each of the delay units 213, 223, 233, and 243 along a configured path. In other words, the calculation results may be transferred in a set order. Accordingly, the partial addition units 212, 222, 232, and 242 may arrange the calculation results in the set order and store the arranged calculation results in the registers of the delay units 213, 223, 233, and 243. Alternatively, the partial addition units 212, 222, 232, and 242 may not perform the addition operation but may transfer output values of the input units 211, 212, 213, and 214 along the configured path to store newly arranged output values in the registers of the delay units 213, 223, 233, and 243.

(i) Each of the partial addition units 212, 222, 232, and 242 receive at least one of outputs of the input units and perform a partial addition operation on the received output. (ii) Each of the partial addition units 212, 222, 232, and 242 may perform any one of various combinations of calculations according to a configuration value. (iii) Each of the partial addition units 212, 222, 232, and 242 transfers the calculation result to the register of the delay unit. The registers of all the delay units 213, 223, 233, and 243 are D1, D2, D3, and D4, respectively. As described above, the partial addition units 212, 222, 232, and 242 perform any one of various combinations of calculations and transfer the input data, without change, to the registers or transfer the calculation results to the registers. During this process, the partial addition units 212, 222, 232, and 242 may store data in D1, D2, D3, and D4, respectively based on configuration. In other words, the partial addition units 212, 222, 232, and 242 may rearrange input data or calculation results of the input data in a specific order and store the rearranged input data or calculation results in D1, D2, D3, and D4.

Meanwhile, the partial addition units may be referred to as calculation units or calculators which perform addition operations.

In FIG. 4, a calculation network including the partial addition units 212, 222, 232, and 242 is indicated by A.

According to configuration values input in a current cycle, output data of the plurality of registers included in the delay units 213, 223, 233, and 243 may pass through the plurality of input units and the plurality of calculation units (partial addition units) and may be arranged again (rearranged) with input points of the plurality of registers included in the delay units 213, 223, 233, and 243. According to configuration values newly input in the next cycle, the rearranged data may be supplied to the calculation units (partial addition units) again through the input units. In the next cycle, the input units 211, 212, 213, and 214 may selectively output the data transferred from the delay units 213, 223, 233, and 243.

In FIG. 4, the delay processing unit including the delay units 213, 223, 233, and 243 is indicated by B.

Consequently, when arranged data processed in a first cycle can be used in a second cycle which is the next cycle, the parallel processing unit 200 can perform consecutive parallel data processing.

The embodiments and the drawings appended in the present specification just represent only a part of the technical spirit included in the present invention. It will be apparent that modified examples and specific embodiments that can be easily devised by those of ordinary skill in the art within the range of the technical spirit of the above-described specification and drawings are included in the scope of the present invention.

The invention claimed is:

1. A parallel processing device which allows consecutive parallel data processing to be performed, the parallel processing device comprising:
a plurality of input units configured to receive memory output data from a memory and delayed data from a plurality of delay units respectively;
a plurality of addition units configured to selectively receive input data among output data from the plurality of input units according to configuration values for each addition unit of the plurality of addition units, and perform addition operation for the input data in parallel; and
the plurality of the delay units configured to delay input data for one cycle,
wherein each delay unit of the plurality of the delay units delays output data from each addition unit of the plurality of addition units and outputs the delayed output data to each input unit of the plurality of input units, and
wherein the plurality of inputs units, the plurality of addition units, and the plurality of delay units are each implemented via at least one processor.

2. The parallel processing device of claim 1, wherein the plurality of input units output the delayed data to the plurality of addition units in next cycle after the one cycle.

3. The parallel processing device of claim 1, wherein each input unit of the plurality of input units includes a multiplexer for selecting one of the memory output data and the delayed output data from each delay unit of the plurality of the delay units.

4. The parallel processing device of claim 1, wherein the plurality of input units transfer output data to the plurality of addition units through a bus.

5. The parallel processing device of claim 1, further comprising a decision processing unit configured to receive the delayed output data, and calculate or determine based on the delayed output of the plurality of delay units when data processing is finished, wherein the decision processing unit is implemented via at least one processor.

* * * * *